United States Patent
Gloekler et al.

(10) Patent No.: US 7,430,624 B2
(45) Date of Patent: Sep. 30, 2008

(54) HIGH SPEED ON-CHIP SERIAL LINK APPARATUS AND METHOD

(75) Inventors: Tilman Gloekler, Gaertringen (DE);
Ingemar Holm, Stuttgart (DE); Ralph C. Koester, Tuebingen (DE); Mack W. Riley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 11/242,676

(22) Filed: Oct. 4, 2005

(65) Prior Publication Data
US 2007/0079025 A1   Apr. 5, 2007

(51) Int. Cl.
G06F 13/12 (2006.01)
G06F 13/00 (2006.01)

(52) U.S. Cl. .......................... 710/65; 710/305; 713/400

(58) Field of Classification Search .............. 710/58–61, 710/65–71, 305–307; 713/375, 400, 500–503
See application file for complete search history.

(56) References Cited

U.S. PATENT DOCUMENTS

| | | | | |
|---|---|---|---|---|
| 5,864,309 A * | 1/1999 | Hung | ........................... | 341/61 |
| 6,480,512 B1 * | 11/2002 | Ahn | ........................... | 370/545 |
| 6,993,671 B2 * | 1/2006 | Pricer et al. | .................. | 713/400 |
| 7,124,334 B2 * | 10/2006 | Kashiwakura | ............... | 714/712 |
| 7,200,767 B2 * | 4/2007 | Jonnalagadda | .............. | 713/400 |

* cited by examiner

*Primary Examiner*—Christopher Shin
(74) *Attorney, Agent, or Firm*—Stephen J. Walder, Jr.; Diana R. Gerhardt

(57) ABSTRACT

A converter apparatus and method are provided that transforms an external low speed industry standard interface into an on-chip high speed serial link (HSSL). The converter of the present invention is preferably placed in close vicinity of the external interface. The HSSL operates at the system clock speed and, as a result, the HSSL interface signals can be readily treated like any other timed signal facilitating the physical design process. Because synchronization is performed once in the converter near the external interface and the signals along the HSSL of the present invention may be treated like any other timed signal, the need for interface units in each processing element of the chip to perform synchronization is eliminated. Thus, the complexity and silicon area used by the present invention is reduced. The converter enables the maximum speed for the serial interface, which is crucial in power-on-reset, manufacturing testing, and chip debugging.

6 Claims, 7 Drawing Sheets

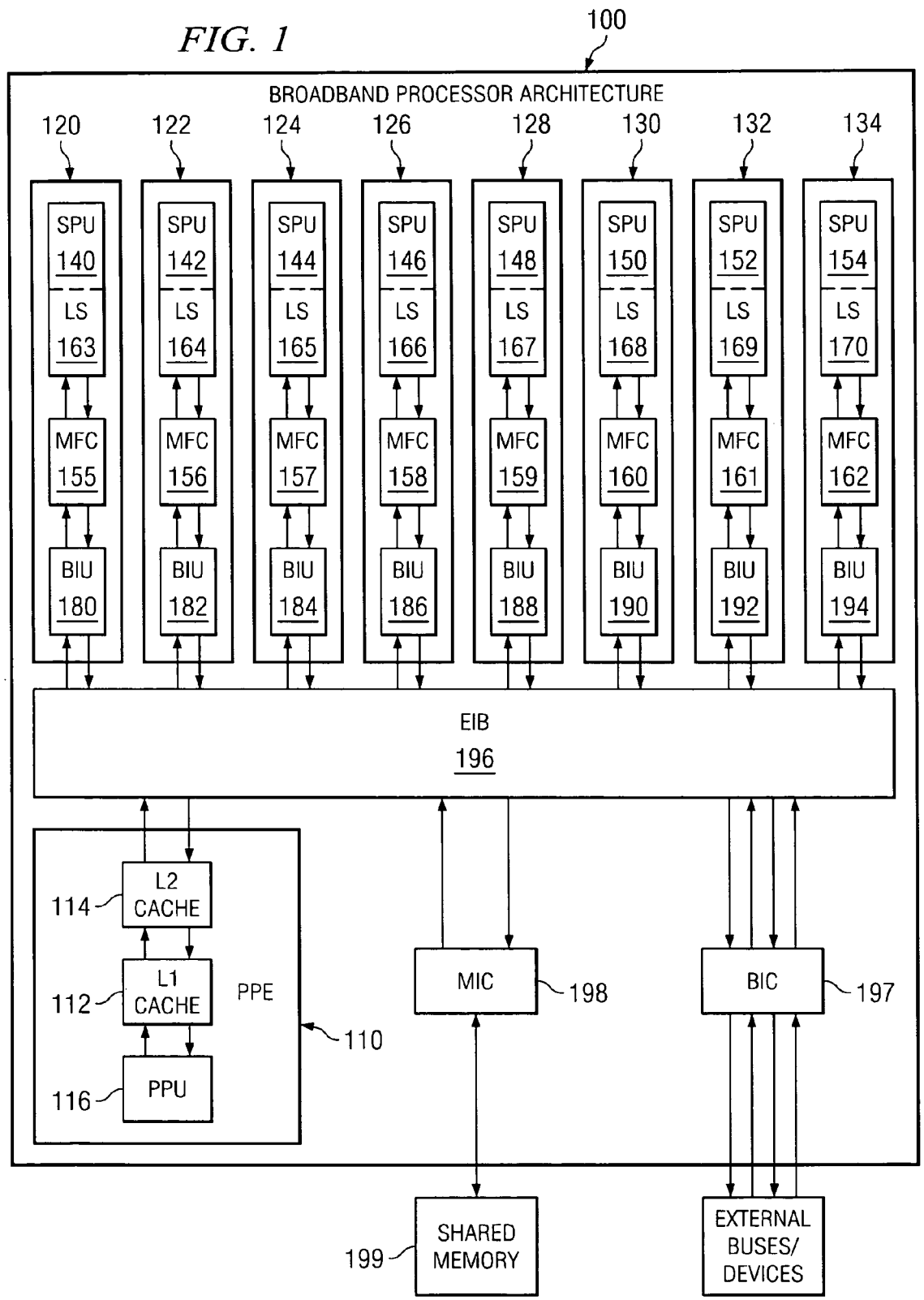

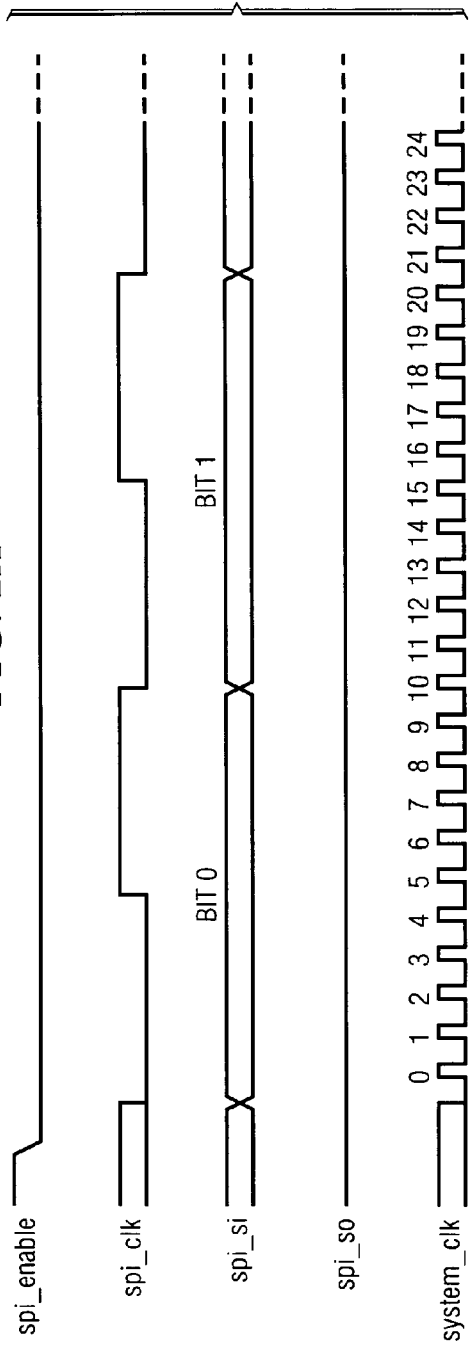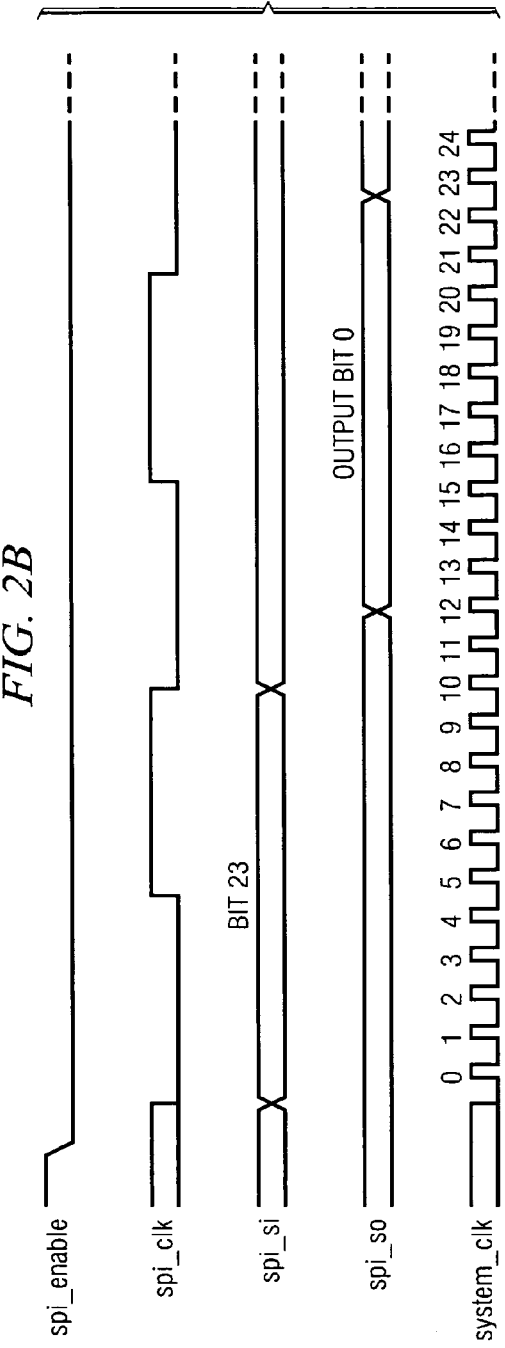

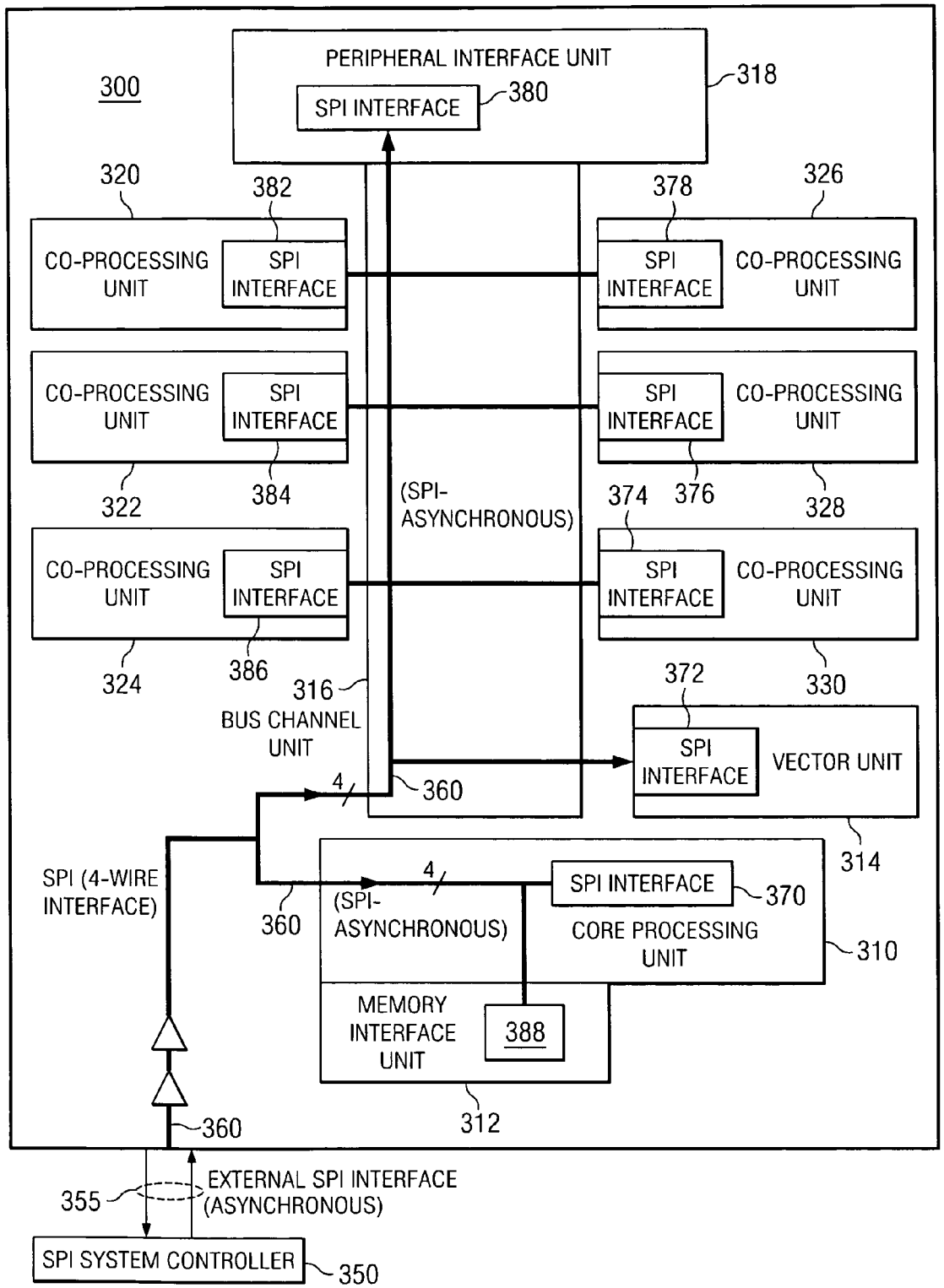

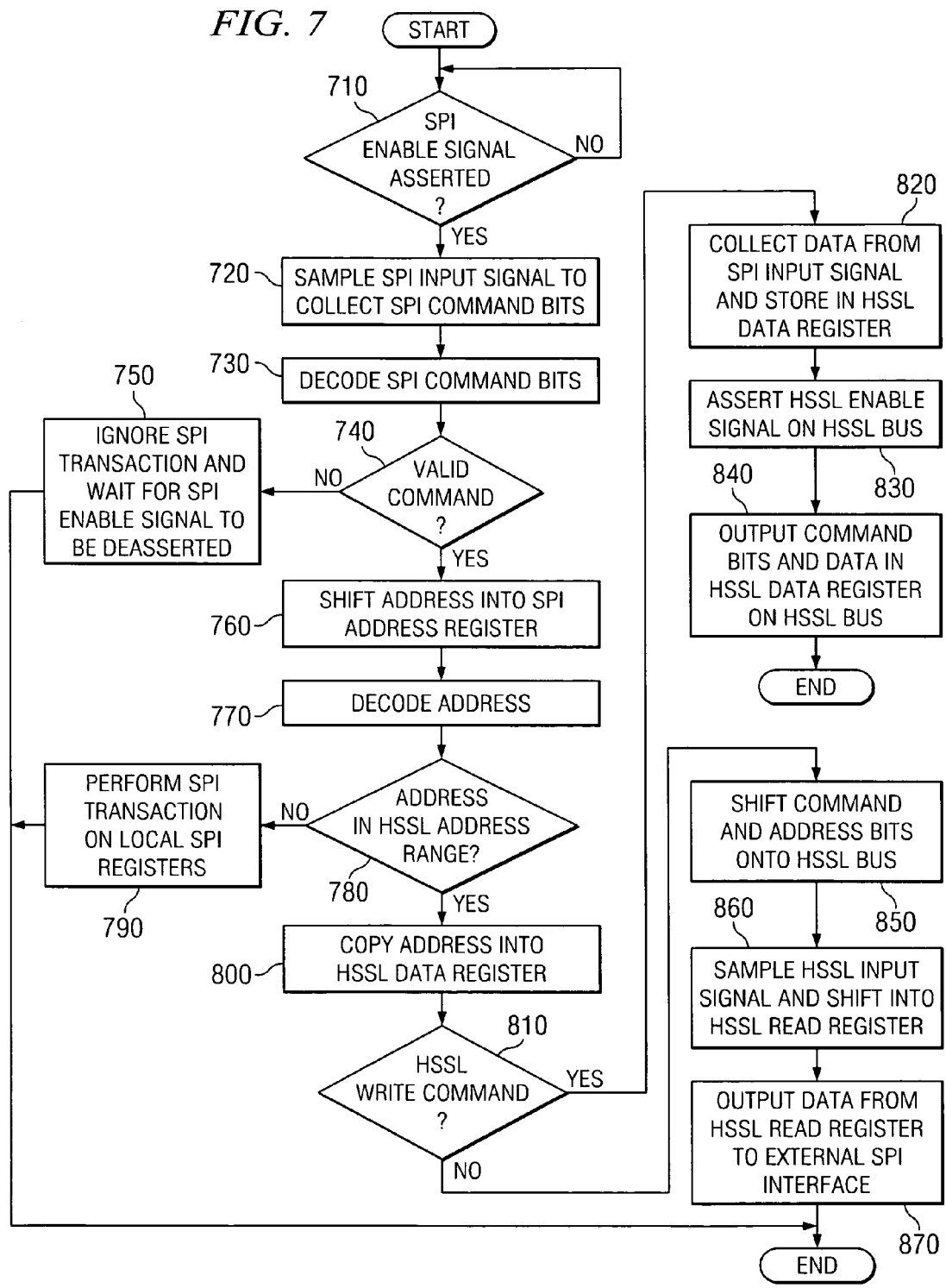

HIGH SPEED ON-CHIP SERIAL LINK APPARATUS AND METHOD

BACKGROUND OF THE INVENTION

1. Technical Field

The present invention relates generally to an improved integrated circuit chip. More specifically, the present invention is directed to a high speed on-chip serial link apparatus and method.

2. Description of Related Art

State-of-the-art very large scale integrated (VLSI) chips need asynchronous serial interfaces to load configuration data for power-on reset, manufacturing test, debugging, and the like. These interfaces typically operate at very low clock frequencies compared to the system clocks and have clock ratios on the order of 100 to 10000 times slower than the system clock cycle, depending on the chosen implementation. These low clock frequencies result in slow power-on sequences, long manufacturing test cycles per chip, and long delays to transfer debug information during the chip "bring-up" phase.

In recent years, more and more stand-alone chips with separate asynchronous serial interfaces are integrated into complex systems-on-a-chip using the latest VLSI technologies. The known solution to this integration problem is to replicate the asynchronous serial interfaces for each unit including the synchronization logic and the complete decoder. This replication results in a large overhead with regard to silicon area and an additional clock distribution network.

Two known solutions for the physical interconnection of these interfaces on the chip exist. In a first solution, a serial clock, with a frequency much lower than the system cycle frequency, is distributed to the asynchronous serial interfaces. From a timing perspective with a physical design correlation, these clocks of the asynchronous interface can be treated as non-critical "don't care" (DC) signals.

In a second solution, the asynchronous serial interfaces are implemented with the maximum clock frequency according to the external component specification used. This requires that a complete new balanced clock tree be designed.

The first approach significantly reduces the system's performance due to the low frequency serial clock. With the second approach, significantly more design effort must be spent because of the added complexity to the physical design (additional clock domain and timed data signals).

SUMMARY OF THE INVENTION

In view of the above, it would be beneficial to have a high speed on-chip serial link that does not require a low frequency clock signal or significantly more complex design effort to enable the loading configuration data for power-on reset, manufacturing test, debugging, and the like. The present invention provides such a high speed on-chip serial link.

The apparatus and method of the present invention provides a converter that transforms an external low speed industry standard interface, such as Joint Test Action Group (JTAG), Serial Peripheral Interface (SPI), or Inter-Integrated Circuit ($I^2C$), into an on-chip high speed serial link. In one preferred embodiment of the present invention, a converter is provided for transforming a 4-wire external SPI interface into an on-chip, 3-wire, high speed serial link (HSSL). The converter of the present invention is preferably placed in close vicinity of the external interface, e.g., the SPI pads.

The HSSL of the present invention operates at the system clock speed and, as a result, the HSSL interface signals can be readily treated like any other timed signal facilitating the physical design process. Because synchronization is performed once in the converter near the external interface and the signals along the HSSL of the present invention may be treated like any other timed signal, the need for interface units in each processing element of the chip to perform synchronization is eliminated. Thus, the complexity and silicon area used by the present invention is reduced.

Another advantage of the present invention is that the conversion from the standard interface to HSSL is only limited by the performance of the external interface components used. A limitation of the serial clock speed as caused by the usage of the first state-of-the-art approach discussed above does not occur. For example, for an approach using a distributed serial clock with a frequency much slower than the system cycle, the frequency ratio with a system clock of 1 Ghz would be at least 1:1000 to satisfy the direct current (DC) physical design rules. The mechanism of the present invention operates at the same clock speed and frequency as the system clock.

With the mechanism of the present invention, an additional distributed clock-tree is not required, such as would be required in the second state-of-the-art solution discussed above. The present invention avoids the need for an additional distribution clock-tree due to the fact that the system clock is used for the HSSL and the converter is placed near the external interface. Thus, the negative physical design impacts as caused by implementing the second state-of-the-art approach discussed above are avoided.

The mechanism of the present invention enables the maximum speed for the serial interface, which is crucial in power-on-reset (POR), manufacturing testing, and chip debugging. With POR, many chips require loading of configuration data to initialize registers and memories. As a function of the amount of data, the interface speed has a direct impact on the boot time of a system. The present invention maximizes the speed of the serial interface and thus, provides the maximum performance during POR.

For special manufacturing tests in chip testmode, direct access to internal units, such as input/output (I/O) units, is required using a serial interface. The speed of this interface directly affects the costly tester time per chip. An improvement from 1:1000 to 1:10 is significant in this case. The mechanism of the present invention maximizes the speed for such a serial interface and thus, greatly reduces the cost of manufacturing tests in terms of tester time per chip.

With regard to chip debugging, for the bring-up phase, large amounts of data need to be transferred in order to initialize and observe on-chip registers and memories, e.g., in order to load and run architectural verification programs or shift on-chip scan chains. Such data is transferred by way of a serial interface and thus, maximizing the speed of this serial interface greatly impacts the performance of chip debugging operations.

In one exemplary embodiment of the present invention, a data processing device comprising at least one processing unit, a high speed serial link bus coupled to the at least one processing unit, and a converter coupled to the high speed serial link bus. The at least one processing unit may operate at a system clock speed. The converter may convert low speed asynchronous input signals, that are clocked at a speed less than the system clock speed, into synchronous output signals, that are clocked at the system clock speed and which are output to the at least one processing unit via the high speed serial link bus.

The converter may be positioned within the data processing device in close proximity to an external peripheral interface so as to minimize a length of low speed asynchronous input signal lines. The converter may comprise an external partition for synchronizing low speed asynchronous input signals to the system clock and an internal partition for controlling transmission of data onto and from the high speed serial link bus. The external partition may comprise an asynchronous interface that receives asynchronous input signals from an external peripheral interface and a command register coupled to the asynchronous interface that stores command bits from asynchronous input signals. The external partition may further comprise an address register coupled to the asynchronous interface that stores address bits from asynchronous input signals and a high speed serial link range decoder coupled to the address register that determines if an address stored in the address register is within an high speed serial link range. In addition, the external partition may comprise finite state machine logic coupled to the asynchronous interface, the command register, and the address register, and which controls an operation of the external partition. The external partition may also comprise a bit counter coupled to the finite state machine logic and which counts a number of signal transitions of an asynchronous clock.

The internal partition of the converter may comprise a data register coupled to an asynchronous interface of the external partition and the high speed serial link bus, and which stores address bits and data bits from asynchronous input signals and a read register coupled to the asynchronous interface of the external partition and the high speed serial link bus, and which stores data from synchronous input signals received via the high speed serial link bus. In addition, the internal partition may further comprise finite state machine logic that controls an operation of the internal partition with regard to write operations to the high speed serial link bus.

The converter may convert asynchronous low speed Serial Peripheral Interface (SPI), JTAG, or I$^2$C input signals into the synchronous high speed serial link signals. The converter may operate by determining if an enable signal is asserted via an external interface, sampling a low speed asynchronous input signal to collect command bits from the input signal, if it is determined that an enable signal is asserted, and decoding the command bits. A determination may be made as to whether a valid command has been asserted based on the decoded command bits.

The converter may shift an address of the low speed asynchronous input signal into an address register if it is determined that a valid command has been asserted. The converter may also decode the address of the low speed asynchronous input signal and determine if the decoded address is part of a high speed serial link (HSSL) address range. The address may be copied, by the converter, into an HSSL data register if the decoded address is determined to be part of the HSSL address range.

The converter may further operate by determining if the valid command is a HSSL write command, collecting data from the low speed asynchronous input signal, and storing the data in a HSSL data register. In addition, an HSSL enable signal may be asserted on an HSSL bus and the command bits and data in the HSSL data register on the may be output on the HSSL bus at system clock speed. The converter may also output the command bits and address on the HSSL bus at system clock speed, if it is determined that the valid command is not an HSSL write command. The HSSL read data of an HSSL input signal may be sampled on the HSSL bus and stored in an HSSL read register. The HSSL read data may then be output to an external interface.

The at least one processing unit, high speed serial link bus, and a converter may all be fabricated on a same integrated circuit chip. The at least one processing unit may comprise a core processing unit and at least one co-processing unit. The core processing unit may be a power processing element, the at least one co-processing unit may be a synergistic processing element, and the data processing device may be a broadband engine data processing device. The data processing device may be one of an integrated circuit chip, a multi-chip package, a computerized toy, a gaming console, a hand-held computing device, a portable computing device, a desktop computing device, a server, or a mainframe computing device.

A method is also provided by the present invention in which at least one processing unit is provided, a high speed serial link bus coupled to the at least one processing unit is provided, and a converter coupled to the high speed serial link bus is provided. The converter may be provided at a position within the data processing device that is in close proximity to an external peripheral interface so as to minimize a length of low speed asynchronous input signal lines. The providing of the converter may comprise providing an external partition for synchronizing low speed asynchronous input signals to the system clock and providing an internal partition for controlling transmission of data onto and from the high speed serial link bus.

Providing the external partition may comprise providing an asynchronous interface that receives asynchronous input signals from an external peripheral interface and providing a command register coupled to the asynchronous interface that stores command bits from asynchronous input signals. Providing the external partition may further comprise providing an address register coupled to the asynchronous interface that stores address bits from asynchronous input signals and providing a high speed serial link range decoder coupled to the address register that determines if an address stored in the address register is within an high speed serial link range. Providing the external partition may also comprise providing finite state machine logic coupled to the asynchronous interface, the command register, and the address register, and which controls an operation of the external partition. Providing the external partition may further comprise providing a bit counter coupled to the finite state machine logic and which counts a number of signal transitions of an asynchronous clock.

Providing the internal partition may comprise providing a data register coupled to an asynchronous interface of the external partition and the high speed serial link bus, and which stores address bits and data bits from asynchronous input signals. Providing the internal partition may further comprise providing a read register coupled to the asynchronous interface of the external partition and the high speed serial link bus, and which stores data from synchronous input signals received via the high speed serial link bus. Providing the internal partition may also comprise providing finite state machine logic that controls an operation of the internal partition with regard to write operations to the high speed serial link bus.

The present invention further provides a method, in a data processing device, for converting low speed asynchronous input signals into high speed serial link signals. The method may comprise determining if an enable signal is asserted via an external interface, sampling a low speed asynchronous input signal to collect command bits from the input signal, if it is determined that an enable signal is asserted, and decoding the command bits. The method may further comprise determining if a valid command has been asserted based on the decoded command bits and decoding an address of the low speed asynchronous input signal, if it is determined that a valid command has been asserted. In addition, a determination may be made as to whether the decoded address is part of a high speed serial link (HSSL) address range and the method may include copying the address into an HSSL data register if the decoded address is determined to be part of the HSSL address range. A determination as to whether the valid command is a HSSL write command may be made, data may be collected from the low speed asynchronous input signal and stored in the HSSL data register, an HSSL enable signal may be asserted on an HSSL bus, and the command bits and the data in the HSSL data register may be output on the HSSL bus at system clock speed.

If it is determined that the valid command is not an HSSL write command, the method may further comprise outputting the command bits and address on the HSSL bus at system clock speed, sampling HSSL read data of an HSSL input signal from the HSSL bus and storing the HSSL read data in an HSSL read register, and outputting the HSSL read data to the external interface.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary block diagram of a data processing system in which aspects of the present invention may be implemented;

FIG. 2A is an exemplary SPI timing diagram illustrating the SPI standard protocol for shift-in of SPI data;

FIG. 2B is an exemplary SPI timing diagram illustrating the SPI standard protocol for shift-out of SPI data;

FIG. 3 is an exemplary block diagram illustrating a distribution of a SPI 4-wire interface having distributed conversion in accordance with a known system-on-a-chip approach;

FIG. 7 is a flowchart outlining an exemplary operation of a SPI to HSSL converter in accordance with one exemplary embodiment of the present invention.

DETAILED DESCRIPTION OF THE PREFERRED EMBODIMENTS

Figure 4:
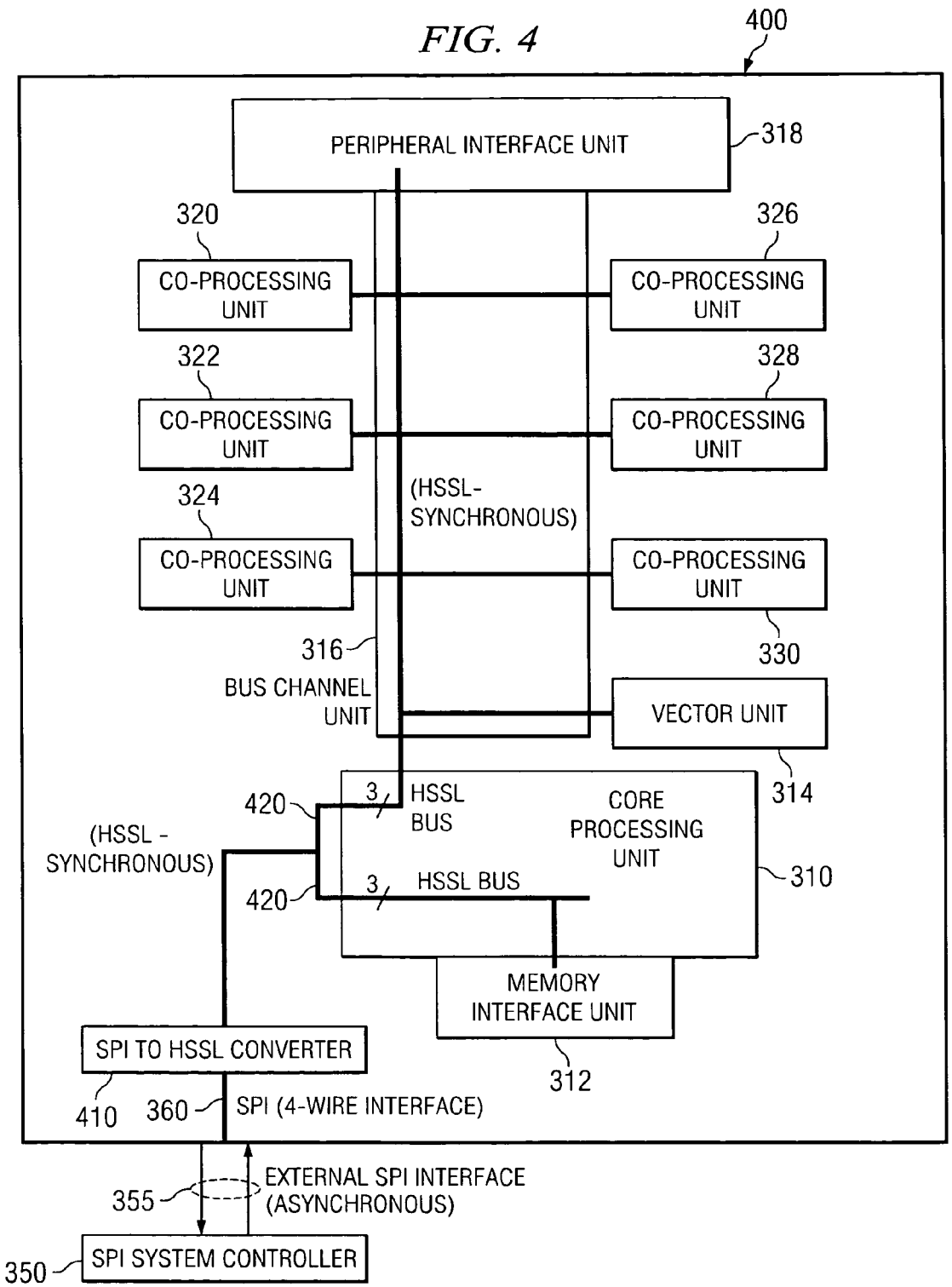
FIG. 4 is an exemplary block diagram illustrating one exemplary embodiment of the present invention in which an SPI to HSSL converter is utilized.

The present invention provides a high speed on-chip serial link apparatus and method. As such, the present invention is especially well suited for use with integrated circuit chips. In particular, in the exemplary embodiments of the present invention, the high speed on-chip serial link apparatus and method is used for on-chip signal communication in multi-processor microprocessor chips. In one exemplary embodiment, the present invention is implemented with a CELL Broadband Engine Architecture in which there is a power processor element and multiple synergistic processor elements. While this particular architecture will be used to explain the inventive aspects of the present invention, the present invention is not limited to use with such an architecture. To the contrary, the present invention may be used with any integrated circuit chip in which an external, off-chip, peripheral device interface is used to communicate with devices on the chip, without departing from the spirit and scope of the present invention.

FIG. 1 is an exemplary block diagram of a data processing system in which aspects of the present invention may be implemented. The exemplary data processing system shown in FIG. 1 is an example of the CELL Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The apparatus and method of the present invention provides a converter that transforms an external low speed industry standard interface for off-chip peripheral devices to communicate with devices that are on-chip, such as Joint Test Action Group (JTAG), Serial Peripheral Interface (SPI), or Inter-Integrated Circuit ($I^2C$), into an on-chip high speed serial link. In one preferred embodiment of the present invention, a converter is provided for transforming a 4-wire external SPI interface into an on-chip, 3-wire, high speed serial link (HSSL). The converter of the present invention is preferably placed in close vicinity of the external interface, e.g., the SPI pads.

The HSSL of the present invention operates at the system clock speed and, as a result, the HSSL interface signals can be readily treated like any other timed signal facilitating the physical design process. Because synchronization is performed once in the converter near the external interface and the signals along the HSSL of the present invention may be treated like any other timed signal, the need for interface units in each processing element of the chip to perform synchronization is eliminated. Thus, the complexity and silicon area used by the present invention is reduced.

Another advantage of the present invention is that the conversion from the standard interface to HSSL is only limited by the performance of the external interface components used. A limitation of the serial clock speed as caused by the usage of the first state-of-the-art approach discussed above does not occur. For example, for an approach using a distributed serial clock with a frequency much slower than the system cycle, the frequency ratio with a system clock of 1 Ghz would be at least 1:1000 to satisfy the direct current (DC) physical design rules. The mechanism of the present invention operates at the same clock speed and frequency as the system clock.

With the mechanism of the present invention, an additional distributed clock-tree is not required, such as would be required in the second state-of-the-art solution discussed above. The present invention avoids the need for an additional distribution clock-tree due to the fact that the system clock is used for the HSSL and the converter is placed near the external interface. Thus, the negative physical design impacts as caused by implementing the second state-of-the-art approach discussed above are avoided.

The mechanism of the present invention enables the maximum speed for the serial interface, which is crucial in power-on-reset (POR), manufacturing testing, and chip debugging. With POR, many chips require loading of configuration data to initialize registers and memories. As a function of the amount of data, the interface speed has a direct impact on the boot time of a system. The present invention maximizes the speed of the serial interface and thus, provides the maximum performance during POR.

For special manufacturing tests in chip testmode, direct access to internal units, such as input/output (I/O) units, is required using a serial interface. The speed of this interface directly affects the costly tester time per chip. An improvement from 1:1000 to 1:10 is significant in this case. The mechanism of the present invention maximizes the speed for such a serial interface and thus, greatly reduces the cost of manufacturing tests in terms of tester time per chip.

With regard to chip debugging, for the bring-up phase, large amounts of data need to be transferred in order to initialize and observe on-chip registers and memories, e.g., in order to load and run architectural verification programs or shift on-chip scan chains. Such data is transferred by way of a serial interface and thus, maximizing the speed of this serial interface greatly impacts the performance of chip debugging operations.

As mentioned above, in one exemplary embodiment, the converter of the present invention converts a 4-wire SPI interface to a 3-wire HSSL for communicating signals to on-chip processing units, interfaces, and other units. While the exemplary embodiments will be described with reference to an SPI interface, the present invention is not limited to such. Rather, converters such as the one that will be described hereafter, may be provided for converting from JTAG interfaces, $I^2C$ interfaces, and the like, to an on-chip HSSL.

In order to better understand the functioning of the converter of the present invention, it is first beneficial to understand the SPI standard in order to understand how the converter of the present invention converts from the SPI standard to the on-chip HSSL. The Serial Peripheral Interface (SPI) is a 4-wire serial communications interface used by many microprocessor peripheral chips. The SPI provides support for low/medium bandwidth (4 megabit) network connection amongst processors and other devices supporting the SPI.

SPI is a master/slave interface. When two devices communicate using the SPI, one is referred to as the "master" and the other as the "slave" device. The serial clock is driven by the master device.

When using SPI, data is simultaneously transmitted and received, resulting in a full-duplexed protocol. Table 1 below shows the standard SPI connections.

TABLE 1

Standard SPI Interface Connections

| Signal Name | Master Signal Direction | Slave Signal Direction | Description |
|---|---|---|---|
| spi_si | output | input | Scan input data to slaves, source data from master |
| spi_so | input | output | Scan output from slave, scan input to master |
| spi_clk | output | input | SPI clock signal |

TABLE 1-continued

Standard SPI Interface Connections

| Signal Name | Master Signal Direction | Slave Signal Direction | Description |
| --- | --- | --- | --- |
| spi_enable | output | input | Enable signal for slave |

FIG. 2A is an exemplary SPI timing diagram illustrating the SPI standard protocol for shift-in of SPI data. FIG. 2B is an exemplary SPI timing diagram illustrating the SPI standard protocol for shift-out of SPI data. For simplification of the present description, the following conventions are used whenever a timing diagram is referenced, however the present invention is not limited to such conventions. The following conventions are only used for ease of description and are not intended to state or imply any limitation with regard to the present invention:

(1) Bit ordering: Big endian number convention is shown. The most significant bit (bit 0) is sent first for address, control and data;

(2) Clocking: All given examples will sample serial input data on the rising edge of the serial clock and drive serial output data on the falling edge of the clock. An edge detection is used to determine when to launch and capture data out of the clock;

(3) Start of cycle: A valid cycle is started on the first rising clock edge in which the enable signal is active. Activation of the enable signal should be driven and removed on the falling edge of the clock.

As shown in FIG. 2A, the spi_si signal is used to output data from the master device to the slave device based on the spi_clk signal. On the falling edge of the spi_clk signal, following the spi_enable signal going low, transmission of bits 0 . . . n are triggered. As shown in FIG. 2B, the spi_so signal is used to output data from the slave device to the master device based on the system_clk signal. On the rising edge of the system_clk signal, output of output bits 0 . . . n are triggered. The 4-wire SPI signals described above are used to communicate between off-chip peripheral devices and on-chip devices as will be described with reference to FIG. 3.

FIG. 3 is an exemplary block diagram illustrating a distribution of a SPI 4-wire interface having distributed conversion in accordance with a known system-on-a-chip approach. As shown in FIG. 3, a system-on-a-chip (SOC) 300 is provided with a core processing unit 310, e.g., PPE 110, memory interface unit 312, e.g., MIC 198, a vector unit 314, a bus channel unit 316, e.g., EIB 196, co-processing units 320-330, e.g., SPEs 120-134, and peripheral interface unit 318, e.g., BIC 197. In addition, the SOC 300 includes SPI 4-wire interface signal lines 360 running to each of the on-chip devices 310-330. With this known approach to providing SPI signals to devices 310-330 on-chip from an external SPI system controller 350 and external SPI interface 355, each processing device 310, 314, 320-330 and peripheral interface unit 318 must have their own SPI interface 380 for performing conversion of asynchronous signals to synchronous signals.

The SPI signals (spi_clk, spi_si, spi_so, spi_enable), driven from a master device off-chip, are received asynchronously, relative to a system clock, on the chip via the SPI system controller 350, external SPI interface 355, and SPI 4-wire signal lines 360. In this approach, the 4 wires are handled as a separate clock tree and distributed to the clock synchronization units, i.e. SPI interfaces 370-388. These clock synchronization units or SPI interfaces 370-388 exist for each sub-partition of the SOC 300 that needs a connection to the external SPI interface 355, e.g., core processing unit 310, vector unit 314, co-processing units 320-330, and peripheral interface unit 318.

The resulting distribution of the 4-wire SPI signals, which have a speed much slower than the system clock speed (e.g., the SPI wires have a speed on the order of 100 Mhz while the system clock speed is on the order of 1 Ghz), results in long wires having to be routed in the SOC 300 design. These wires need to be balanced regarding the physical design of the SOC 300. In order to perform this balancing with the physical design, the SOC 300 shown in FIG. 3 has buffers for buffering the SPI 4-wire signals and placement of the SPI interfaces 370-388 such that the physical design is balanced. Achieving such a balanced physical design requires extra effort during a physical design stage of the system-on-a-chip design and fabrication process.

Alternatively, the SPI wires may be handled as "don't care" signals timing-wise in order to minimize the physical design effort. In other words, the external SPI interface 355 typically runs relatively slow compared to the slowest system clock domain (e.g., a ratio of 1 Mhz to 1 Ghz). Therefore, the 4-wires of the SPI interface may be handled as static signals within the chip timing estimation tool used during design of the system-on-a-chip. If the demand for fast Power On Reset (POR) sequences does not exist or there are only few accesses to the external SPI interface 355 during the functional mode of the chip, this design approach may be chosen. However, in most actual SOC designs, such demands are present and the SOC accesses the external SPI interface 355 often. Thus, in many SOC designs, the "don't care" approach is not a feasible option.

The present invention provides an alternative approach to handling an external peripheral device interface with regard to on-chip clock synchronization. The present invention provides a converter near the external peripheral device interface that transforms the external asynchronous interface into a synchronous internal HSSL bus which is distributed to each unit on the chip within the system cycle, e.g., 1 Ghz.

FIG. 4 is an exemplary block diagram illustrating one exemplary embodiment of the present invention in which a serial peripheral interface (SPI) to high speed serial link (HSSL) converter is utilized. Elements shown in FIG. 4 having similar reference numbers to elements shown in FIG. 3 are meant to refer to similar elements in order to illustrate the difference between the present invention and the known approach shown in FIG. 3. As shown in FIG. 4, rather than distributing the slow speed 4-wire SPI interface wires to the various sub-partitions of the system-on-a-chip, the present invention minimizes the length of such slow speed wires 360 to a minimum length required between the external SPI interface 355 and SPI to HSSL converter 410.

This minimizing of the slow speed signal lines 360 aids in obtaining the fastest possible clock speeds between the external SPI interface 355 and the SPI to HSSL converter 410, e.g., 100-200 Mhz. In addition, by minimizing the length of these slow speed signal lines 360, a separate clock tree implementation, as described above with regard to FIG. 3, is not necessary in the SOC 400 design according to the present invention.

The SPI to HSSL converter 410, as will be described in greater detail hereafter, includes an external partition and an internal partition. The external partition comprises synchronization logic for synchronizing the asynchronous signals from the external SPI interface 355 to a system clock. The internal partition runs at the system clock speed and outputs the synchronous 3-line HSSL output signals that are distributed to the various units, e.g., core processing unit 310, co-processing units 320-330, etc., of the SOC 400 via an HSSL bus 420. The 3-line HSSL output signals are provided to an HSSL bus 420 which distributes the HSSL output signals to each unit of the SOC 400 within a system cycle.

Figure 5A:
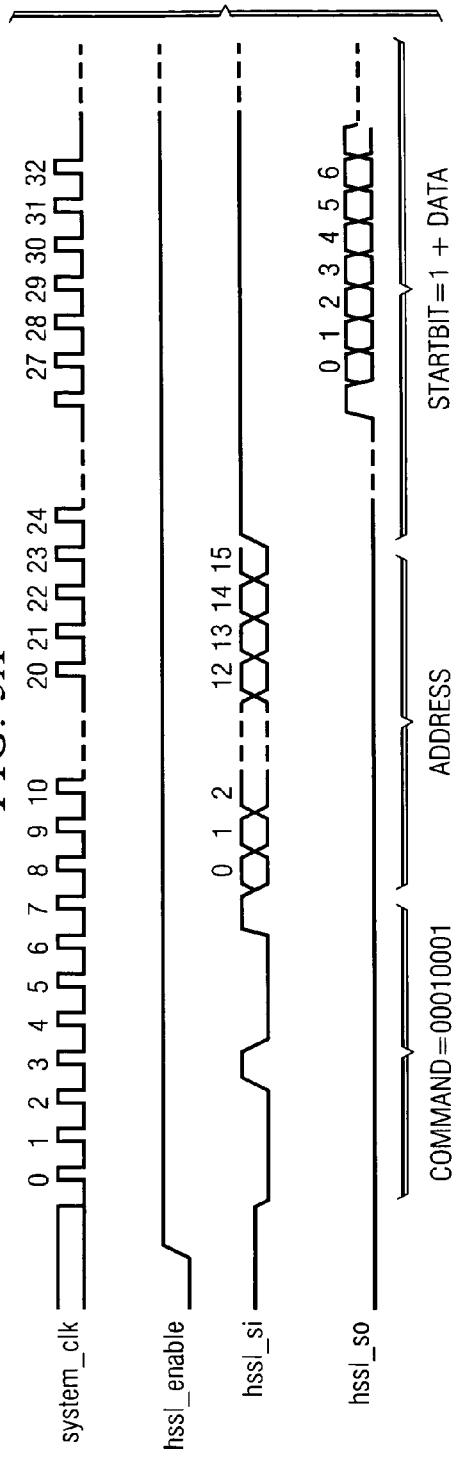
FIG. 5A is an exemplary HSSL timing diagram illustrating an HSSL read operation in accordance with on exemplary embodiment of the present invention.
Figure 5B:
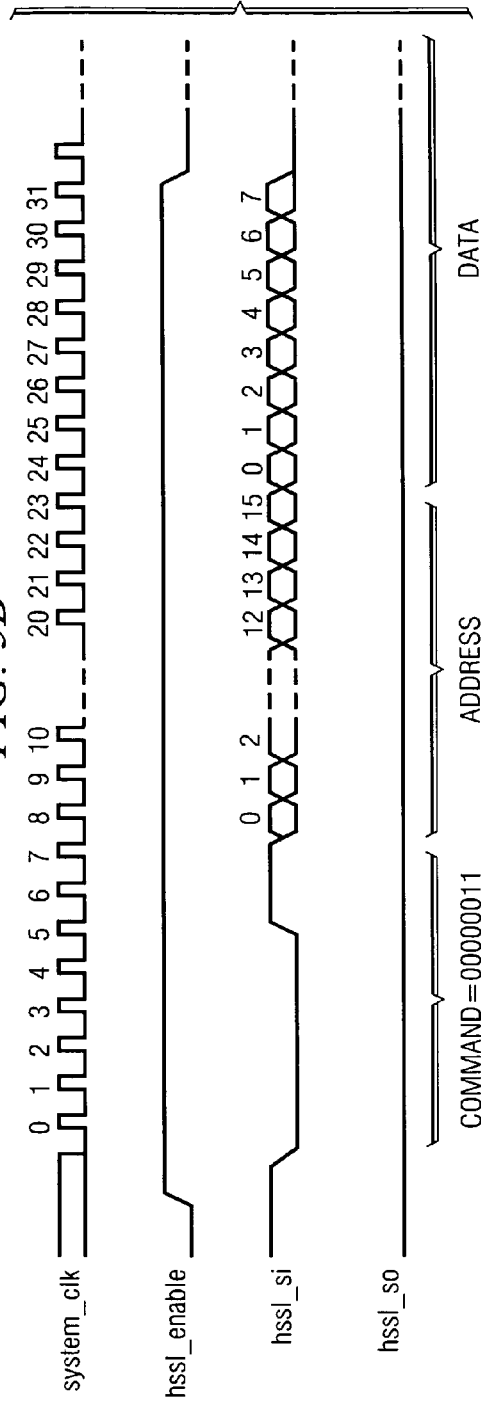
FIG. 5B is an exemplary HSSL timing diagram illustrating an HSSL write operation in accordance with one exemplary embodiment of the present invention.

FIG. 5A is an exemplary HSSL timing diagram illustrating an HSSL read operation in accordance with on exemplary embodiment of the present invention. FIG. 5B is an exemplary HSSL timing diagram illustrating an HSSL write operation in accordance with one exemplary embodiment of the present invention. As shown in FIGS. 5A and 5B, according to the HSSL bus protocol, a command, an address and data are transferred one serial bit being transmitted along the HSSL bus every system cycle. For an HSSL read operation, the receiving device snoops the address and determines if the requested data is available. Read data is sent back via the hssl_so line. A start bit is added to inform the SPI to HSSL converter about the incoming data. This start bit can be used as a ready indicator within the external SPI device, e.g., a polling register that includes and holds the received start bit.

Figure 6:
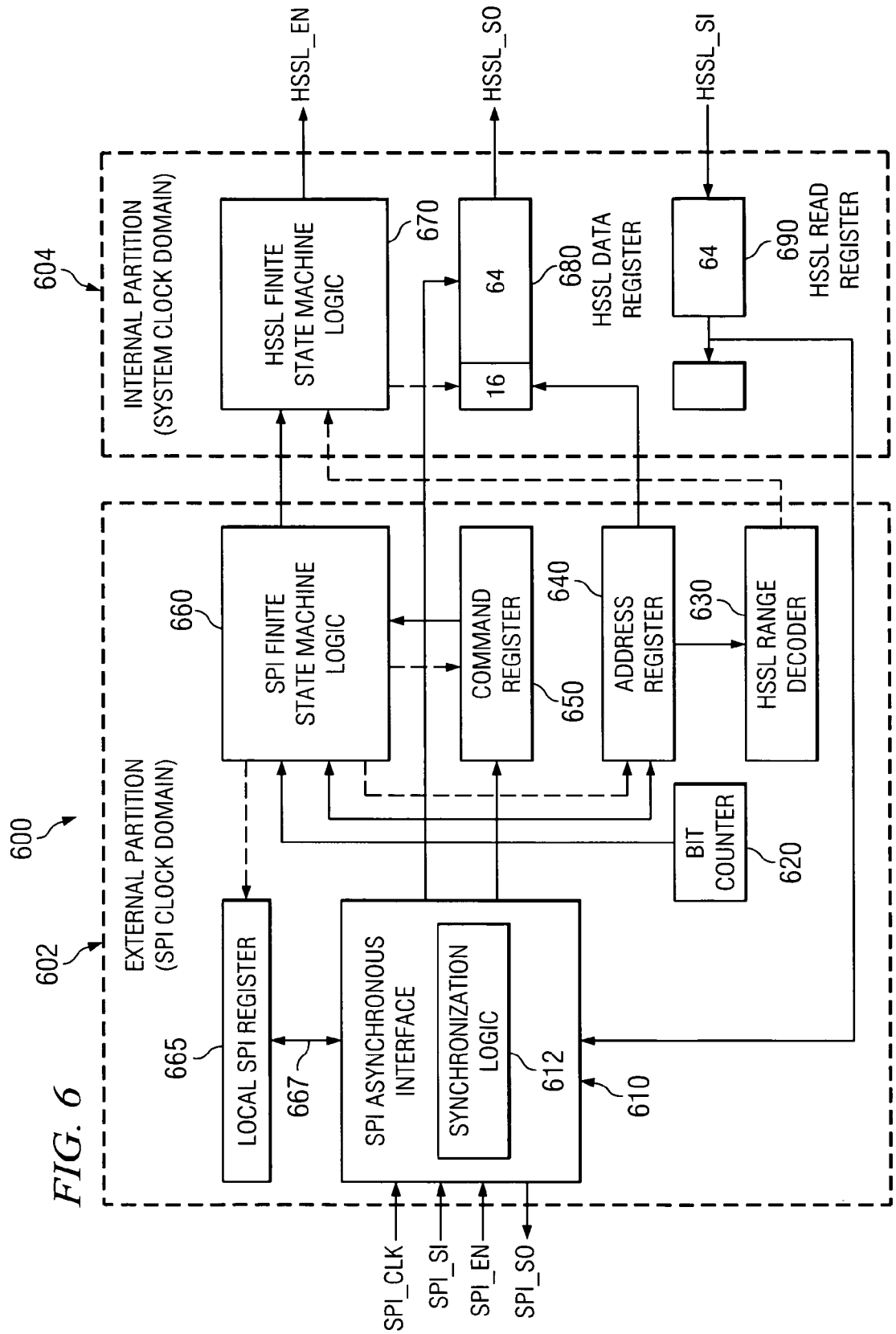
FIG. 6 is an exemplary block diagram illustrating an SPI to HSSL converter in accordance with one exemplary embodiment of the present invention.

FIG. 6 is an exemplary block diagram illustrating an SPI to HSSL converter in accordance with one exemplary embodiment of the present invention. The SPI to HSSL converter 600, hereafter referred to simply as the "converter 600," includes an external partition 602 and an internal partition 604. The external partition 602 operates in synchronization with the SPI clock domain, i.e. spi_clk. The internal partition 604 operates in synchronization with a system clock domain, i.e. system_clk.

The external partition 602 comprises a SPI asynchronous interface 610, a bit counter 620, a HSSL range decoder 630, an address register 640, a command register 650, and a SPI finite state machine logic 660. The internal partition 604 comprises HSSL finite state machine logic 670, a HSSL data register 680, an HSSL read register 690, and a "first 1" register 695.

The SPI asynchronous interface 610 receives the SPI signals, spi_clk, spi_si, and spi_enable, as input signals and provides spi_so as an output signal to the external SPI interface. For providing HSSL output signals to the HSSL bus of the SOC, the SPI asynchronous interface 610 includes synchronization logic 612 which operates in the following manner. An edge detector (not shown) in the synchronization logic 612 of the SPI asynchronous interface 610 detects an edge of the SPI enable signal (spi_en) and thereafter, the starting SPI command will start the SPI conversion by the synchronization logic 612. That is, the detection of the edge of the spi_en signal enables the edge detection logic for the asynchronous clock (spi_clk). A spi command starts whenever the spi_en signal changes its state from inactive (0b1) to active (0b0). The detection will be finished whenever the enable signal (spi_en) switches back to its inactive state.

The SPI clock (spi_clk) is sampled and a 1 cycle system clock pulse pops-up for each detected rising and falling edge. In other words, every rising and falling edge of the spi_clk is detected and results in a 1 cycle pulse within the system clock (e.g., 1 Ghz pulse, 1× rising pulse, 1× falling pulse per asynchronous cycle). The rising pulse is used to control the bit_counter 620. These synchronous clock pulses are connected to the bit counter 620 which, together with the HSSL range decoder 630, controls the SPI finite state machine (FSM) logic 660. Thus, based on the value of the bit counter 620, it can be determined whether the portion of the input signal spi_si being received corresponds to a command portion, an address portion, or data (see timing diagram in FIG. 2A, for example).

The serial bit stream, generated based on the spi_si input signal, is stored, under the control of the SPI FSM logic 660, in either the command register 650 or the address register 640 depending on the state of the bit counter 620. The address register 640 is used to access a local SPI register 665 in the external partition 602 itself. This local SPI register 665 acts as a local buffer where other (requested) information of either the asynchronous interface itself, e.g., asynchronous interface status information, or general status information of the chip may be stored (e.g., a configuration word). The local SPI register 665 is not allocation to any particular partition (e.g., co-processing unit). The local SPI register 665 has a parallel input or status bus 667. For read operations, data in the local SPI register 665 is shifted out serially to the spi_so shift out pin.

In addition, the address register 640 is copied to the internal partition 604 if registers in the HSSL range are requested, as discussed hereafter. Status information is routed back to the shift out pin (spi_out) after data is converted back to the slow external SPI clock.

To determine if external or internal data was requested or written, the HSSL range decoder 630 is used. The HSSL range decoder 630 looks at the first bit, i.e. the most significant bit (MSB), of the address register 640 which indicates if the address is within the HSSL range or not: msb,bit(0): 0b0=none-HSSL, 0b1=HSSL. Addressable registers may be either architectured registers which are part of the processor specification or registers which are memory mapped.

In operation, the SPI FSM logic 660 waits until an externally connected master asserts a signal on the SPI enable pin (spi_en). Thereafter, 8 command bits, which are sampled at the rising edge of the spi_clk signal, are shifted in to the command register 650. The command bits are decoded in the SPI FSM logic 660 and, if a valid command is detected, the following 16 bits are shifted into the address register 640. If an invalid command is detected, the SPI transaction is ignored and the SPI FSM logic 660 waits until the spi_en signal is deasserted.

After shifting in the address, the value in the address register 640 is decoded by HSSL range decoder 630. If the address is part of the HSSL address range, the address is copied into the HSSL data register 680 in the internal partition 604 and the HSSL FSM logic 670 is started. Otherwise, the address is part of the local SPI range and the SPI transaction is performed on local SPI register 665. The local SPI register 675 can be loaded with data out of a plurality of different status registers of the chip level logic, e.g., I/O configuration register, program status word register, configuration word register, and the like.

With the HSSL FSM logic 670, if an HSSL write operation is to be performed, 64 bits of data are shifted from the SPI asynchronous interface 610 into the HSSL data register 680. As a result, the HSSL data register 680, in the depicted example, includes 16 bits identifying an address and 64 bits of data. Thereafter, the signal HSSL_EN is asserted and 88 bits of data (the 8 bit command, 16 bit address, and 64 bits of data) are shifted out of the converter 600 onto the HSSL bus using the HSSL_SO signal at system clock speed. While the exemplary embodiment shifts 88 bits of data, the present invention is not limited to such an implementation. To the contrary, other implementations of the present invention may use a different number of bits of data than that of the exemplary embodiment. For example, the number of command bits may be reduced to less than 8 bits, e.g., to only 1 bit if only simple read and write operations need to be performed. The number of address bits may also be reduced if one or more bits are redundant due to the decoding that has already been performed in the HSSL range decoder 630.

In the case of an HSSL read operation, only the command and address need to be shifted-in resulting in a total of 24 bits that are transferred in with the HSSL_SI signal at system clock speed. The HSSL_SI signal is sampled and shifting of the HSSL read register 690 stops after the "first 1" register 695 receives the value "1" of the start bit. The start bit is followed by the 64 bit read data that is stored in the HSSL read register 690. The data of the internal HSSL read register 690 is transferred to the SPI asynchronous interface 610 on a bit by bit basis with each detected falling edge of the asynchronous clock. The read data is routed directly to the shift-out pin (spi_so). This is controlled by the SPI FSM logic 660.

FIG. 7 is a flowchart outlining an exemplary operation of a SPI to HSSL converter when handling an SPI transaction in accordance with one exemplary embodiment of the present invention. It will be understood that each block, and combination of blocks, of the flowchart illustration in FIG. 7 can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts by determining if a SPI enable signal is asserted on the SPI enable pin via an external SPI interface (step 710). If not, the operation loops back until the SPI enable signal is asserted. If a SPI enable signal is asserted, the SPI input signal is sampled, via a SPI asynchronous interface, based on the SPI clock to thereby collect the SPI command bits (step 720). The command bits are decoded (step 730) and a determination is made as to whether the command bits identify a valid command (step 740). For example, the command bits may be stored in the command register 650. The decoder may be located in the SPI FSM logic 660, for example, and has a list of valid commands available. The command bits in the command register 650 may be compared, by the SPI FSM logic 660, to valid commands in the valid command list to determine if a valid command is present. Of course, other mechanisms for validating a command may be used without departing from the spirit and scope of the present invention.

If the command bits do not identify a valid command, then the SPI transaction is ignored and the operation waits for the SPI enable signal to be deasserted (step 750). If the command bits identify a valid command, then the SPI address of the SPI transaction is shifted into an SPI address register (step 760).

The value in the SPI address register is decoded (step 770) and a determination is made as to whether the decoded address is part of the HSSL address range (step 780). If the decoded address is not part of the HSSL address range, the address is part of the local SPI range and the SPI transaction is performed on local SPI registers (step 790).

If the decoded address is part of the HSSL address range, the address is copied into the HSSL data register (step 800). A determination is then made as to whether the command is a HSSL write command (step 810). If the address is a HSSL write command, then data is collected from the SPI input signal and stored in the HSSL data register (step 820). The HSSL enable signal is asserted on the HSSL bus (step 830) and the command bits and data in the HSSL data register are output on the HSSL bus at system clock speed (step 840). The operation then terminates.

If the command is not an HSSL write command, i.e. the command is an HSSL read command, the command and address bits are shifted out onto the HSSL bus at system clock speed (step 850). The HSSL input signal is then sampled and the received data is shifted in to the HSSL read register until a "1" is shifted into a "first 1" register (step 860). The data stored in the HSSL read register is then output to the external SPI interface from the HSSL read register via the SPI asynchronous interface (step 870). The operation then terminates.

Thus, the present invention provides a mechanism for performing conversion of asynchronous external peripheral interface signals that are associated with a low speed clock to internal synchronous high speed serial link signals. The mechanism of the present invention comprises a converter that is placed in close proximity to the external peripheral interface so as to minimize the length of low speed signal lines. In addition, the presence of the converter in close proximity to the external peripheral interface removes the need to have interface units provided in each sub-partition of the integrated circuit.

The mechanism of the present invention maximizes the interface speed which is crucial for fast boot sequences, short manufacturing test cycles, and chip bring-up. The mechanism of the present invention reduces the silicon area of replicated interfaces for each sub-partition and requires only on small conversion unit. The mechanism of the present invention reduces the design effort required for physical design as only synchronous internal buses at chip clock frequency are used and no additional clock tree implementations are required.

The converter circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Such advanced computer products may include gaming consoles, hand-held computing devices, portable computing devices, desktop computing devices, servers, mainframe computing devices, and the like.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, comprising:
providing at least one processing unit;
providing a high speed serial link bus coupled to the at least one processing unit; and
providing a converter coupled to the high speed serial link bus, wherein the at least one processing unit operates at a system clock speed, and wherein the converter converts low speed asynchronous input signals, that are clocked at a speed less than the system clock speed, into synchronous output signals, that are clocked at the system clock speed, and which are output to the at least one processing unit via the high speed serial link bus.

2. The method of claim 1, wherein the converter is provided at a position within the data processing device that is in close proximity to an external peripheral interface so as to minimize a length of low speed asynchronous input signal lines.

3. The method of claim 1, wherein providing the converter comprises providing an external partition for synchronizing low speed asynchronous input signals to the system clock and providing an internal partition for controlling transmission of data onto and from the high speed serial link bus.

4. The method of claim 3, wherein providing the external partition comprises:
providing an asynchronous interface that receives asynchronous input signals from an external peripheral interface;
providing a command register coupled to the asynchronous interface that stores command bits from asynchronous input signals;
providing an address register coupled to the asynchronous interface that stores address bits from asynchronous input signals;
providing a high speed serial link range decoder coupled to the address register that determines if an address stored in the address register is within an high speed serial link range;
providing finite state machine logic coupled to the asynchronous interface, the command register, and the address register, and which controls an operation of the external partition; and
providing a bit counter coupled to the finite state machine logic and which counts a number of signal transitions of an asynchronous clock.

5. The method of claim 3, wherein providing the internal partition comprises:
providing a data register coupled to an asynchronous interface of the external partition and the high speed serial link bus, and which stores address bits and data bits from asynchronous input signals;
providing a read register coupled to the asynchronous interface of the external partition and the high speed serial link bus, and which stores data from synchronous input signals received via the high speed serial link bus; and
providing finite state machine logic that controls an operation of the internal partition with regard to write operations to the high speed serial link bus.

6. A method, in a data processing device, for converting low speed asynchronous input signals into high speed serial link signals, comprising:
determining if an enable signal is asserted via an external interface;
sampling a low speed asynchronous input signal to collect command bits from the input signal, if it is determined that an enable signal is asserted;
decoding the command bits;
determining if a valid command has been asserted based on the decoded command bits;
decoding an address of the low speed asynchronous input signal, if it is determined that a valid command has been asserted;
determining if the decoded address is part of a high speed serial link (HSSL) address range;
copying the address into an HSSL data register if the decoded address is determined to be part of the HSSL address range;
determining if the valid command is a HSSL write command;
collecting data from the low speed asynchronous input signal;
storing the data in the HSSL data register;
asserting an HSSL enable signal on an HSSL bus; and
outputting the command bits and the data in the HSSL data register on the HSSL bus at system clock speed, wherein if it is determined that the valid command is not an HSSL write command, the method further comprises:
outputting the command bits and address on the HSSL bus at system clock speed;
sampling HSSL read data of an HSSL input signal from the HSSL bus;
storing the HSSL read data in an HSSL read register; and
outputting the HSSL read data to the external interface.

* * * * *